US012724114B2

(12) United States Patent
Choi et al.

(10) Patent No.: US 12,724,114 B2

(45) Date of Patent: Sep. 1, 2026

(54) METHOD AND APPARATUS WITH RADAR SIGNAL PROCESSING

(71) Applicant: Samsung Electronics Co., Ltd., Suwon-si (KR)

(72) Inventors: Sungdo Choi, Suwon-si (KR); Seung Tae Khang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 484 days.

(21) Appl. No.: 18/112,723

(22) Filed: Feb. 22, 2023

(65) Prior Publication Data

US 2024/0094338 A1 Mar. 21, 2024

(30) Foreign Application Priority Data

Sep. 8, 2022 (KR) ........................ 10-2022-0114243

(51) Int. Cl.
*G01S 7/35* (2006.01)
*G01S 7/03* (2006.01)
(Continued)

(52) U.S. Cl.
CPC ................ *G01S 7/354* (2013.01); *G01S 7/03* (2013.01); *G01S 13/42* (2013.01); *G01S 13/931* (2013.01)

(58) Field of Classification Search
CPC . G01S 7/354; G01S 7/03; G01S 13/42; G01S 13/931; G01S 7/356; G01S 13/347;
(Continued)

(56) References Cited

U.S. PATENT DOCUMENTS 6,791,493 B1 * 9/2004 Rose ......................... G01S 3/46 342/442
9,250,319 B2 2/2016 Van Der Merwe et al.
(Continued)

FOREIGN PATENT DOCUMENTS

CN 109490819 A * 3/2019 .............. G01S 3/12
EP 3 978 951 A1 4/2022
JP 5473386 B2 4/2014

OTHER PUBLICATIONS

Kang, S, et al. "Improving DOA Estimation Using Virtual Antenna in Automotive Radar." *Department of Electrical and Computer Engineering, The Graduate School Seoul National University* (Feb. 2017).

(Continued)

*Primary Examiner* — William Kelleher
*Assistant Examiner* — Ismaaeel A. Siddiquee
(74) *Attorney, Agent, or Firm* — NSIP Law

(57) ABSTRACT

A method includes extracting a first chirp sequence signal and a second chirp sequence signal from a radar signal, determining a first phase difference of the first chirp sequence signal based on a distance between antenna elements of the array antenna, determining a second phase difference of the second chirp sequence signal based on the distance between the antenna elements of the array antenna, determining a first direction of arrival (DOA) frequency based on a first carrier frequency based on the first phase difference, determining a second DOA frequency based on a second carrier frequency based on the second phase difference, estimating a preliminary DOA of a target based on a frequency difference between the first DOA frequency and the second DOA frequency, determining ambiguous DOA candidates, and selecting a final DOA of the target from the ambiguous DOA candidates based on the preliminary DOA.

20 Claims, 13 Drawing Sheets

(51) Int. Cl.
*G01S 13/42* (2006.01)
*G01S 13/931* (2020.01)

(58) Field of Classification Search
CPC ...... G01S 13/584; G01S 13/343; G01S 13/36; G01S 7/35; G01S 3/46; G01S 2013/0245
See application file for complete search history.

(56) References Cited

U.S. PATENT DOCUMENTS

| | | | | |
|---|---|---|---|---|
| 2013/0278463 | A1* | 10/2013 | Nilsson | G01S 3/74 342/417 |
| 2020/0400810 | A1* | 12/2020 | Cho | G01S 13/9047 |
| 2021/0364616 | A1 | 11/2021 | Wang et al. | |
| 2022/0155411 | A1 | 5/2022 | Choi et al. | |
| 2023/0059058 | A1* | 2/2023 | Kishigami | G01S 13/9047 |
| 2023/0314562 | A1* | 10/2023 | van Houtum | G01S 13/003 342/175 |

OTHER PUBLICATIONS

Skolnik, M. “Resolution of Angular Ambiguities in Radar Array Antennas with Widely-Spaced Elements and Grating Lobes.” IRE Transactions on Antennas and Propagation 10.3 (1962): 351-352.
Extended European search report issued on Jan. 17, 2024, in counterpart European Patent Application No. 23188194.7 (10 pages).

* cited by examiner

METHOD AND APPARATUS WITH RADAR SIGNAL PROCESSING

CROSS-REFERENCE TO RELATED APPLICATIONS

This application claims the benefit under 35 USC § 119(a) of Korean Patent Application No. 10-2022-0114243, filed on Sep. 8, 2022, in the Korean Intellectual Property Office, the entire disclosure of which is incorporated herein by reference for all purposes.

BACKGROUND

1. Field

The following description relates to a method and apparatus with radar signal processing.

2. Description of Related Art

Advanced driver-assistance systems (ADASs) may support driving to improve a driver's safety and convenience and avoid dangerous situations by using sensors mounted inside or outside vehicles.

Typically, the sensors that are used in an ADAS may include a camera, an infrared sensor, an ultrasonic sensor, a light detection and ranging (LiDAR) system, and a radar, for example. Compared to the other sensors, these sensor options, radar may be capable of stably measuring objects in the vicinity of a vehicle typically without being affected by environmental conditions around the vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes extracting a first chirp sequence signal of a first carrier frequency and a second chirp sequence signal of a second carrier frequency from a radar signal received through an array antenna in a radar sensor, determining a first phase difference of the first chirp sequence signal based on a distance between antenna elements of the array antenna, determining a second phase difference of the second chirp sequence signal based on the distance between the antenna elements of the array antenna, determining a first direction of arrival (DOA) frequency based on the first carrier frequency of the first chirp sequence signal based on the first phase difference, determining a second DOA frequency based on the second carrier frequency of the second chirp sequence signal based on the second phase difference, estimating a preliminary DOA of a target based on a frequency difference between the first DOA frequency and the second DOA frequency, determining ambiguous DOA candidates at a predetermined time interval based on an ambiguity number derived from an ambiguous DOA of the target measured by the first chirp sequence signal, and selecting a final DOA of the target from the ambiguous DOA candidates based on the preliminary DOA.

The final DOA may include selecting a DOA candidate closest one to the preliminary DOA from the ambiguous DOA candidates as the final DOA of the target.

The array antenna may include a pair of neighboring antenna elements disposed apart from each other at a distance that is larger than at least one of a first half-wavelength of the first chirp sequence signal and a second half-wavelength of the second chirp sequence signal.

The pair of neighboring antenna elements may include an antenna arrangement configured to measure one of an elevation angle or an azimuth angle.

Selecting the final DOA may account for a grating lobe occurring in at least a portion of a DOA spectrum due to the distance.

Selecting of the final DOA may account for a quantization error existing between the preliminary DOA and the final DOA.

The first DOA frequency may be dependent on the first carrier frequency.

The estimating of the preliminary DOA may include estimating the preliminary DOA based on the frequency difference between the first DOA frequency and the second DOA frequency, a velocity of light, the distance between the antenna elements of the array antenna, and the frequency difference between the first carrier frequency and the second carrier frequency.

The ambiguous DOA candidates may be derived from a predetermined equation or a predetermined numerical table based on the ambiguous DOA.

The radar signal may include a first chirp element of the first carrier frequency and a second chirp element of the second carrier frequency, and the first chirp element may alternate with the second chirp element.

In a general aspect a non-transitory computer-readable storage medium storing instructions that, when executed by a processor, cause the processor to perform the method.

In a general aspect an apparatus includes a radar sensor configured to receive a radar signal through an array antenna and a processor configured to extract a first chirp sequence signal of a first carrier frequency and a second chirp sequence signal of a second carrier frequency from the radar signal, determine a first phase difference of the first chirp sequence signal based on a distance between antenna elements of the array antenna, determine a second phase difference of the second chirp sequence signal based on the distance between the antenna elements of the array antenna, determine a first direction of arrival (DOA) frequency based on the first carrier frequency of the first chirp sequence signal based on the first phase difference, determine a second DOA frequency based on the second carrier frequency of the second chirp sequence signal based on the second phase difference, estimate a preliminary DOA of a target based on a frequency difference between the first DOA frequency and the second DOA frequency, determine ambiguous DOA candidates at a predetermined time interval based on an ambiguity number derived from an ambiguous DOA of the target measured by the first chirp sequence signal, and select a final DOA of the target from the ambiguous DOA candidates based on the preliminary DOA.

The processor may be configured to select a DOA candidate closest one to the preliminary DOA from the ambiguous DOA candidates as the final DOA of the target.

The array antenna may include a pair of neighboring antenna elements disposed apart from each other at a distance that is larger than at least one of a first half-wavelength of the first chirp sequence signal and a second half-wavelength of the second chirp sequence signal.

The pair of neighboring antenna elements may include an antenna arrangement configured to measure one of an elevation angle or an azimuth angle.

The selection of the final DOA may account for a grating lobe occurring in at least a portion of a DOA spectrum due to the distance.

The selection of the final DOA may account for a quantization error existing between the preliminary DOA and the final DOA.

In a general aspect a vehicle including a radar sensor configured to receive a radar signal through an array antenna and a processor configured to extract a first chirp sequence signal of a first carrier frequency and a second chirp sequence signal of a second carrier frequency from the radar signal, determine a first phase difference of the first chirp sequence signal based on a distance between antenna elements of the array antenna, determine a second phase difference of the second chirp sequence signal based on the distance between the antenna elements of the array antenna, determine a first direction of arrival (DOA) frequency based on the first carrier frequency of the first chirp sequence signal based on the first phase difference, determine a second DOA frequency based on the second carrier frequency of the second chirp sequence signal based on the second phase difference, estimate a preliminary DOA of a target based on a frequency difference between the first DOA frequency and the second DOA frequency, determine ambiguous DOA candidates at a predetermined time interval based on an ambiguity number derived from an ambiguous DOA of the target measured by the first chirp sequence signal, and select a final DOA of the target from the ambiguous DOA candidates based on the preliminary DOA, and a control system configured to control a vehicle based on the final DOA.

The selection of the final DOA may account for a grating lobe occurring in at least a portion of a DOA spectrum due to the distance.

The selection of the final DOA may account for a quantization error existing between the preliminary DOA and the final DOA.

Other features and aspects will be apparent from the following detailed description, the drawings, and the claims.

Figure 1:
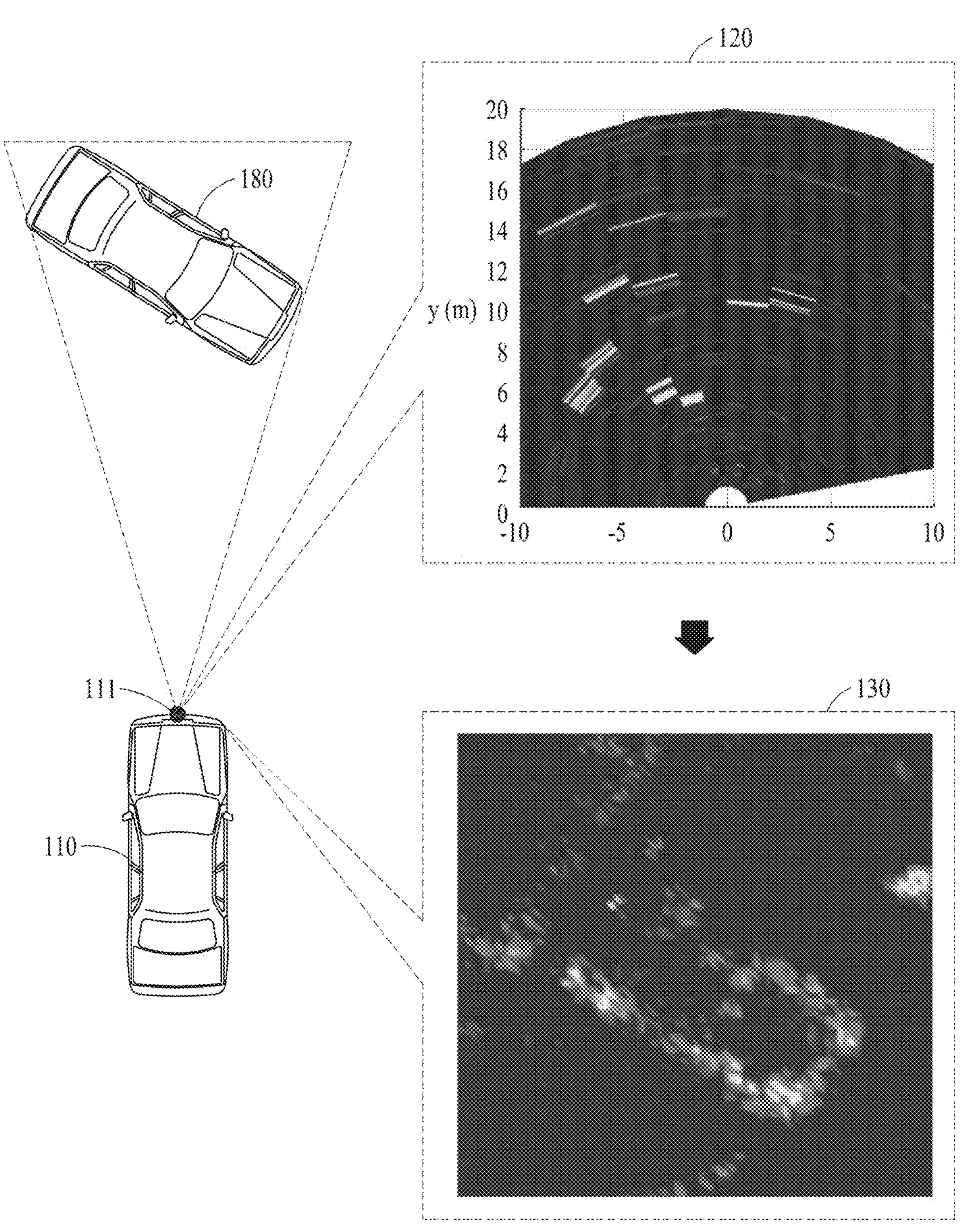
FIG. 1 illustrates an example of recognizing a surrounding environment through a radar signal processing method, according to one embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Due to manufacturing techniques and/or tolerances, variations of the shapes shown in the drawings may occur. Thus, the examples described herein are not limited to the specific shapes shown in the drawings, but include changes in shape that occur during manufacturing.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Herein, advanced driver-assistance systems (ADASs) embodiments, e.g., vehicles, ADAS, or other computing apparatus embodiments, may include one or more of each of various sensors, such as a camera, an infrared sensor, an ultrasonic sensor, a light detection and ranging (LiDAR) system, and a radar. However, environmental conditions can include weather conditions in which optical-based sensors may not be effective. For some radar systems employed in a typical ADAS, typical efforts to provide both the elevation and azimuth information use a non-uniform array of antenna elements within the radar system.

However, there are hardware limits to the arrangement of the antenna elements that provide both azimuth and elevation within such a typical radar system that could result in gating lobe to occur. In such typical non-uniform radar systems, the smallest distance between antenna elements may necessarily be larger than a half-wavelength of the radar's carrier frequency. Thus, in the typical radar system where a non-uniform antenna array is employed to provide an elevation angle with an azimuth angle, grating lobe errors can occur which can cause a false target detection which could lead to the ADAS employing unwanted emergency measures.

FIG. 1 illustrates an example of recognizing a surrounding environment through a method with radar signal processing, according to one or more embodiments. Referring to FIG. 1, a computing apparatus 110 may detect information on a target 180 ahead (for example, range, velocity, direction, and the like) by analyzing a radar signal received from a radar sensor 111. The target 180 may be, for example, another vehicle, a pedestrian, or an obstacle in the road. The radar sensor 111 may be positioned inside or outside the computing apparatus 110, and the computing apparatus 110 may detect the information on the target 180 ahead based on both the radar signal received from the radar sensor 111 and data collected by other sensors that are available (for example, an image sensor, etc.).

Resolving power in radar data processing is generally divided into two areas. First, there is resolving power performance in terms of hardware and then there is resolving power performance in terms of software.

In an example, the resolving power refers to the power of a device to discriminate a very small change, for example, a smallest unit of discriminative power, and it may be expressed as "resolving power=(discriminable smallest scale unit)/(total operation range)". The smaller the resolving power value of the device, the more precise results the device may provide. The resolving power value may also be referred to as the resolving power unit. For example, if the device has a small resolving power value, the device may discriminate a relatively small target and thus, the device may provide results with an increased resolution and an improved precision. If the device has a large resolving power value, the device may not be able to discriminate the small target and thus, its results will necessarily be diminished in its resolution and precision.

The computing apparatus 110 may be mounted on a vehicle as shown in FIG. 1. The vehicle may perform adaptive cruise control (ACC), automatic emergency braking (AEB), blind spot detection (BSD), lane change assistance (LCA), and other similar operations based on the range to the target 180 detected by the computing apparatus 110. Furthermore, the computing apparatus 110 may generate a surrounding map 130 in addition to detecting the range. The surrounding map 130 may represent positions of various targets present around the computing device 110, such as the target 180. A surrounding target may be a dynamic object, such as a vehicle and a human, and may be a static object that is present in a background, such as a guard rail and a traffic light.

As a method of generating the surrounding map 130, a single scan image method may be used. In the single scan image method, the computing device 110 acquires a single scan image 120 from a sensor and generates the surrounding map 130 from the single scan image 120. The single scan image 120 may refer to an image that is generated from a radar signal generated by a single radar sensor 111 and may represent ranges that are indicated by radar signals received from an arbitrary elevation angle as relatively high resolving power. For example, in the single scan image 120 of FIG. 1, a horizontal axis denotes a steering angle of the radar sensor 111 and a vertical axis denotes a range from the radar sensor 111 to the target 180. However, a form of the single scan image is not limited to an example illustrated in FIG. 1, and may be represented in a different format based on a design.

The steering angle may represent an angle corresponding to a target direction from the computing device 110 to the target 180. For example, the steering angle may represent an angle between a heading direction of the computing device 110 (or a radar processing device 110) and a target direction. In an example, the steering angle is described mainly based on a horizontal angle, but is not limited thereto. In another example, the steering angle may apply to the elevation angle.

According to an example embodiment, the computing device 110 may acquire information about a shape of the target 180 through a multi-radar map. The multi-radar map may be generated from a combination of a plurality of radar scan images. For example, the computing device 110 may generate the surrounding map 130 by spatial-temporally combining radar scan images acquired according to a movement of the radar sensor 111. The surrounding map 130 may be a kind of a radar image map and may be used for pilot parking, for example.

According to an example embodiment, the computing device 110 may use direction of arrival (DOA) information to generate the surrounding map 130. The DOA information refers to information indicating a direction in which a radar signal reflected from the target 180 is received. The computing device 110 may identify a direction in which the target 190 is present based on the radar sensor 111 using the DOA information. Therefore, the DOA information may be used to generate radar scan data and the surrounding map 130.

According to an example embodiment, radar information, such as a range, a velocity, a DOA, and map information about the target 180, generated by the computing device 110 may be used to control a vehicle to which the computing device 110 is mounted. For example, the type of controlling related to the control of the vehicle may include a velocity and steering control of the vehicle, such as ACC, AEB, BSD, and LCA described above. A control system of the vehicle may control the vehicle by directly or indirectly using the radar information. For example, in a scenario where the control is based on a Doppler velocity measurement of a target, the control system may decide to accelerate the vehicle to follow a corresponding target or the control system may decide to brake the vehicle to prevent colliding with the corresponding target.

Accordingly, in one or more examples, hardware arrangements may provide improved resolution for both azimuth and elevation data, even in environmental conditions that may undesirably affect reception of radar data.

Figure 2:
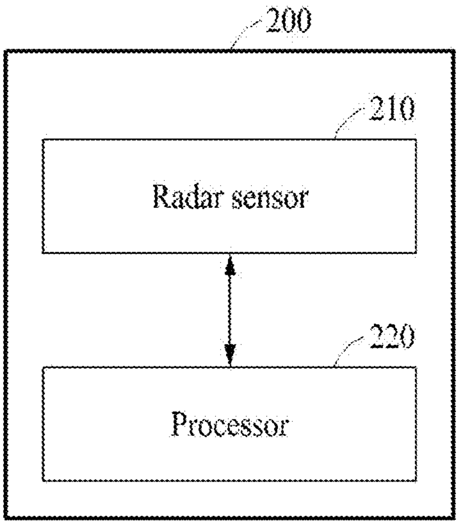
FIG. 2 illustrates an example of a configuration of a computing apparatus, according to one embodiment.

FIG. 2 illustrates an example of a configuration of an apparatus with radar signal processing, according to one embodiment. Referring to FIG. 2, a computing apparatus 200 may include a radar sensor 210 and a processor 220. The radar sensor 210 may radiate a radar signal to an area outside of the radar sensor 210, and may receive a signal, which is based on the radiated radar signal reflected by a target. Here, the radiated radar signal may be referred to as a radar transmission signal, and the received signal may be referred to as a radar reception signal. The radar transmission signal may include a chirp signal which includes a carrier frequency that is modulated based on a frequency modulation model. A frequency of the radar transmission signal may vary within a predetermined band. For example, the frequency of the radar transmission signal may vary linearly within the predetermined band.

The radar sensor 210 may include an array antenna, and through the array antenna, the radar sensor 210 may transmit radar transmission signals and receive radar reception signals. The array antenna may include a plurality of antenna elements. Multiple input multiple output (MIMO) may be implemented through the plurality of antenna elements. Here, a plurality of MIMO channels may be formed by the plurality of antenna elements. For example, a plurality of channels corresponding to M×N virtual antennas may be formed through M transmission antenna elements and N reception antenna elements. Here, radar reception signals received through the respective channels may have different phases based on the respective directions that they were received, or their respective reception directions.

Radar data may be generated based on the radar transmission signal and the radar reception signal. For example, the radar sensor 210 may transmit the radar transmission signal through the array antenna based on the frequency modulation model, may receive the radar reception signal through the array antenna when the radar transmission signal is reflected by the target, and may generate an intermediate frequency (IF) signal based on the radar transmission signal and the radar reception signal. The IF signal may have a frequency corresponding to a difference between the frequency of the radar transmission signal and the frequency of the radar reception signal. The processor 220 may perform a sampling operation on the intermediate frequency signal and may generate radar raw data through a sampling of the results. The radar data may correspond to raw data of an IF.

The processor 220 may generate and use information on the target based on the radar data. For example, the processor 220 may perform range fast Fourier transform (FFT), Doppler FFT, constant false alarm rate detection (CFAR), and DOA estimation, and may obtain the information on the target, such as a range, a velocity, and a direction. The information on the target may be provided for various applications, such as ACC, AEB, BSD, and LCA.

Figure 3:
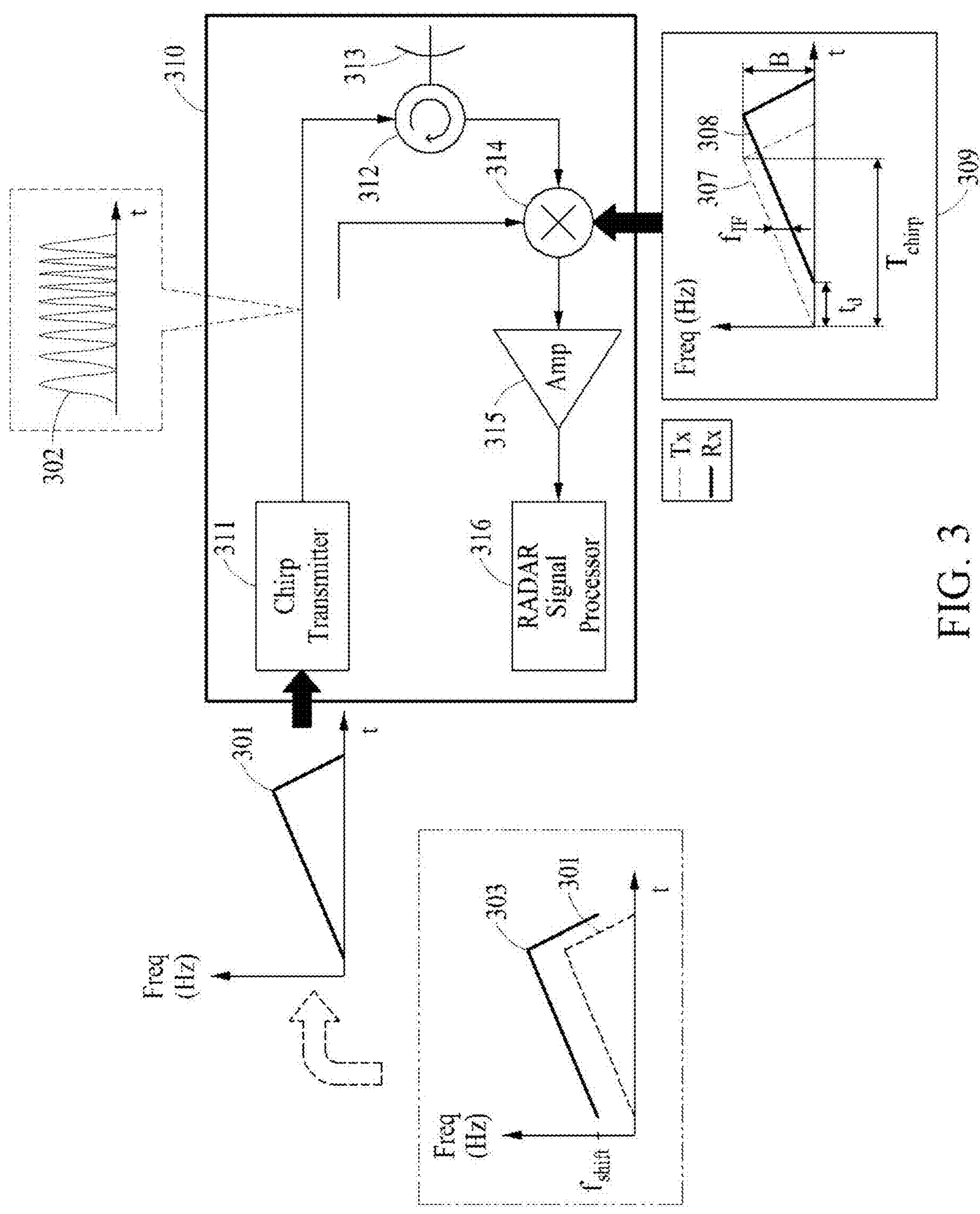
FIG. 3 illustrates an example of a configuration of a radar sensor, according to one embodiment.

FIG. 3 illustrates an example of a configuration of a radar sensor, according to one embodiment. Referring to FIG. 3, a radar sensor 310 may include a chirp transmitter 311, a duplexer 312, an antenna 313, a frequency mixer 314, an amplifier 315, and a radar signal processor 316. The radar signal processor 316 may correspond to the processor 220 of FIG. 2. In this case, the radar signal processor 316 may be placed outside the radar sensor 310, like the processor 220. The radar sensor 310 may radiate a signal through the antenna 313 and may receive a signal through the antenna 313. Although FIG. 3 illustrates a single antenna 313, the antenna 313 may include at least one transmission antenna and at least one reception antenna. For example, the antenna 313 may correspond to an array antenna. For example, the antenna 313 may include three or more reception antenna elements. In this case, the reception antenna elements may be spaced apart at equal intervals.

The radar sensor 310 may be, for example, an mmWave radar and may measure a range to a target by analyzing a change in a waveform of a radar signal and a time of flight (ToF), which is a time until a radiated electric wave returns after being reflected by the target. For reference, compared to an optic-based sensor including a camera, the mmWave radar may detect targets and other elements in front of it regardless of a change in an external environment, such as fog and rain. In addition, since the mmWave radar has excellent cost performance compared to LiDAR, the mmWave radar may be one of the better available sensors that may compensate for the aforementioned disadvantages of the camera. For example, the radar sensor 310 may be implemented as a frequency modulated continuous wave (FMCW) radar. The FMCW radar may provide a robust performance against external noise.

The chirp transmitter 311 may generate a frequency modulated (FM) signal 302 of which a frequency varies overtime. For example, the chirp transmitter 311 may generate the FM signal 302 by performing frequency modulation based on a frequency modulation characteristic of a frequency modulation model 301. The FM signal 302 may be referred to as a chirp signal. Herein, the frequency modulation model 301 may be a model configured to indicate a change in a carrier frequency of a radar transmission signal during a provided transmission time. The vertical axis of the frequency modulation model 301 may represent the carrier frequency, and the horizontal axis may represent time. For example, the frequency modulation model 301 may have a frequency modulation characteristic of linearly changing (for example, linearly increasing or linearly decreasing) the carrier frequency. As another example, the frequency modulation model 301 may have a frequency modulation characteristic of the carrier frequency non-linearly changing.

The frequency modulation model 301 of FIG. 3 may have a frequency modulation characteristic of the frequency linearly increasing over time. The chirp transmitter 311 may generate the FM signal 302 having a carrier frequency based on the frequency modulation model 301. For example, as shown in FIG. 3, the FM signal 302 may represent a waveform in which the carrier frequency gradually increases in some sections, such as where the waveforms are illustrated as being closer together, and a waveform in which the carrier frequency gradually decreases in the remaining sections where the waveforms fall further apart from each other.

The chirp transmitter 311 may generate the FM signal 302 using frequency different modulation models such as frequency models 301 and 303 illustrated in FIG. 3. For example, the chirp transmitter 311 may generate the FM signal 302 by alternately using the frequency modulation model 301 and the frequency modulation model 303. In this example, the FM signal 302 may alternately include a chirp sequence signal interval according to the frequency modulation model 301 and a chirp sequence signal interval according to the frequency modulation model 303. There may be a frequency difference corresponding to a difference value $f_{shift}$ between a chirp of the frequency modulation model 301 and a chirp of the frequency modulation model 303.

The chirp transmitter 311 may transmit the FM signal 302 to the duplexer 312. The duplexer 312 may determine a transmission path and a reception path for signals through the antenna 313. For example, while the radar sensor 310 radiates the FM signal 302, the duplexer 312 may form a signal path from the chirp transmitter 311 to the antenna 313, may transmit the FM signal 302 to the antenna 313 via the formed signal path, which may then radiate the FM signal 302 to the outside. When the radar sensor 310 receives the signal reflected from the target, the duplexer 312 may form a signal path from antenna 313 to the radar signal processor 316. The antenna 313 may receive a reception signal, which is a signal that has been radiated and returned by reflection from an obstacle or target. The radar sensor 310 may transmit the reception signal to the spectrum analyzer 316 through the signal path from the antenna 313 to the spectrum analyzer 316. The signal radiated through the antenna 313 may be referred to as a radar transmission signal, and the signal received through the antenna 313 may be referred to as a radar reception signal.

The frequency mixer 314 may compare a frequency 308 of the radar reception signal, that is reflected from the target and received, and a frequency 307 of the radar transmission signal. For reference, the frequency 307 may vary depending on a change in a carrier frequency indicated by the frequency modulation model 301. The frequency mixer 314 may detect a beat frequency corresponding to a frequency difference between the frequency 308 of the radar reception signal and the frequency 307 of the radar transmission signal. In graph 309 shown in FIG. 3, the frequency difference between the radar transmission signal and the radar reception signal may be constant in a section in which the carrier frequency linearly increases along a time axis in the frequency modulation model 301, and may be proportional to a range between the radar sensor 310 and the target ("object" and "target" are used interchangeably herein). Accordingly, the range between the radar sensor 310 and the target may be derived from the frequency difference between the radar transmission signal and the radar reception signal. A beat frequency signal detected through the frequency mixer 314 may be transmitted to the spectrum analyzer 316 via the amplifier 315.

The beat frequency signal may be represented by Equation 1 shown below.

$$y(f) = \frac{\alpha}{2}\cos\left(\varphi_0 - 2\pi f_c t_d + \pi\frac{B}{T_c}t_d^2 - 2\pi\frac{B}{T_c}t_d t\right) \quad \text{Equation 1}$$

In Equation 1, a may denote path loss attenuation, $\varphi_0$ may denote a phase offset, $f_c$ may denote a carrier frequency, $t_d$ may denote a round-trip delay, B may denote a sweep bandwidth of a transmitted chirp, and $T_c$ may denote a chirp duration. $\varphi_0$ may correspond to a direct current constant value. $T_c$ may indicate a same value as $T_{chirp}$ in graph 309.

In one embodiment, a plurality of radar sensors may be installed in various parts of a vehicle, and a computing apparatus may calculate a distance to a target, a direction, and a relative velocity in all directions of the vehicle based on information sensed by the plurality of radar sensors. The computing apparatus may be mounted on the vehicle, and may provide various functions (for example, ACC, AEB, BSD, and LCA) that assist driving using the calculated information.

Each of the radar sensors may radiate a respective radar transmission signal including a chirp signal of which a frequency is modulated based on a frequency modulation model and may receive a signal reflected from the target. The processor of the computing apparatus may determine the distance from each of the plurality of radar sensors to a target from a frequency difference between the radiated radar transmission signal and the received radar reception signal. In addition, when the radar sensor 310 has a plurality of channels, the processor of the computing apparatus may derive a DOA of the radar reception signal reflected from the target based on phase information in the radar data.

The radar sensor 310 may use a wide bandwidth and adopt MIMO in response to a demand for a wide field of view (FoV) and a high resolution (HR), for various applications. A range resolution may increase by using the wide bandwidth, and an angular resolution may increase by adopting the MIMO. The range resolution may represent a smallest unit to discriminate distance information on the target, and the angle resolution may represent a smallest unit to discriminate DOA information on the target. For example, the radar sensor 310 may use a broadband such as 4 GHz, 5 GHz, or 7 GHz instead of a narrow band such as 200 MHz, 500 MHz, or 1 GHz.

When using MIMO, signals of each channel may need to be distinguished from each other, and for distinguishing signals, time division multiplexing (TDM), frequency division multiplexing (FDM), and code division multiplexing (CDM) may be used, for example. In one embodiment, the radar sensor 310 may distinguish a transmission signal of each transmission based on MIMO through TDM. Based on TDM, since the transmission antennas may need to alternately transmit transmission signals, a time length of the rising interval of a carrier frequency in each transmission signal, that is, a chirp repetition period, may increase. This may cause reduction in an unambiguously measurable Doppler velocity and/or Doppler frequency.

Figure 4:
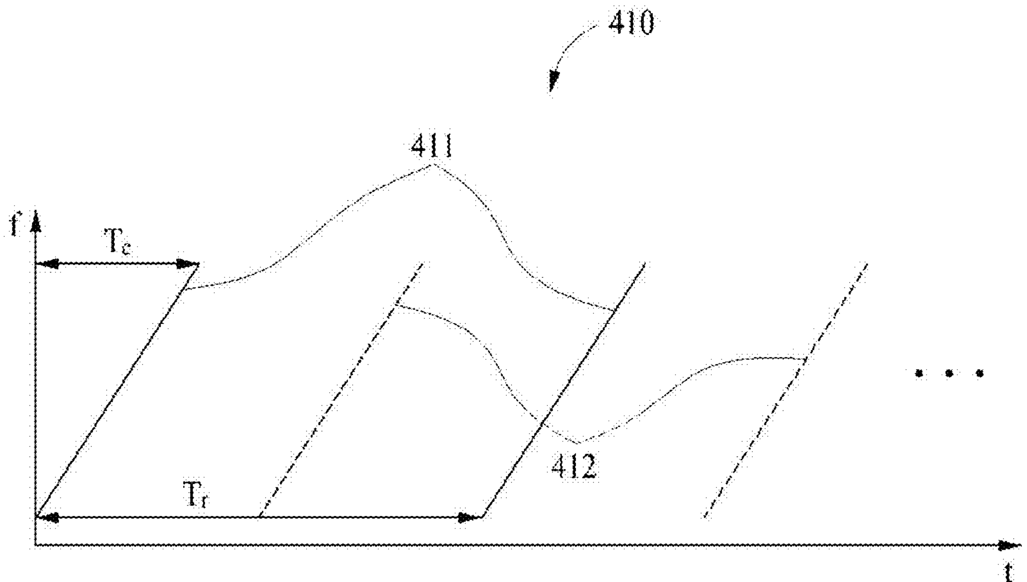
FIG. 4 illustrates an example of a change in a chirp repetition period based on time division multiplexing (TDM), according to one embodiment.

FIG. 4 illustrates an example of a change in a chirp repetition period based on TDM, according to one embodiment. Referring to FIG. 4, a chirp sequence 410 may include a first sub chirp sequence 411 and a second sub chirp sequence 412. For example, the first sub chirp sequence 411 may apply to a transmission signal of a first transmission antenna element of a MIMO array antenna and the second sub chirp sequence 412 may apply to a transmission signal of a second transmission antenna element. In FIG. 4, $T_c$ may represent a chirp duration of the first sub chirp sequence 411, and $T_r$ may represent a repetition period of the first sub chirp sequence 411.

In a method using a chirp sequence waveform, a range of a measurable Doppler velocity may be limited by the chirp repetition period. A maximum value of a measurable Doppler frequency may be represented by Equation 2 shown below.

$$f_{D,max} = \frac{1}{2T_r} \quad \text{Equation 2}$$

In Equation 2, $f_{D,max}$ may denote a maximum value of an unambiguously measurable Doppler frequency. A maximum range of the unambiguously measurable Doppler frequency may be represented by $-f_{D,max}$ to $f_{D,max}$. As shown in Equation 2, $f_{D,max}$ may be dependent on $T_p$. Based on Equation 3 representing a relationship between a Doppler velocity and a Doppler frequency, Equation 4 may be derived.

$$f_D = -\frac{2}{\lambda}v \quad \text{Equation 3}$$

$$v_{D,max} = \frac{\lambda}{4T_r} \quad \text{Equation 4}$$

In Equation 3, $f_D$ may denote a Doppler frequency, $\lambda$ may denote a wavelength, and v may denote a Doppler velocity. In Equation 4, $v_{D,max}$ may denote a maximum value of an unambiguously measurable Doppler velocity. A maximum range of the unambiguously measurable Doppler velocity may be represented by $-v_{D,max}$ to $v_{D,max}$. A sign may be omitted in a process of deriving Equation 4 through Equations 2 and 3, based on a meaning of the maximum value. In addition, since the Doppler velocity and the Doppler frequency may each be converted to the other through Equation 3, a description of the Doppler velocity may be applicable to the Doppler frequency, and vice versa within an acceptable range.

When a radar transmission signal only uses the first sub chirp sequence 411, a chirp repetition period of the radar transmission signal may be $T_c$. Alternatively, when a radar transmission signal uses both the first sub chirp sequence signal 411 and the second sub chirp sequence signal 412 for TDM implementation, a chirp repetition period of the radar transmission signal may be $T_r$. In this case, a range of the unambiguously measurable Doppler velocity may decrease due to an increase in the chirp repetition period. For example, when $T_r$ is twice $T_c$, a measurable range of the Doppler velocity may be reduced to ½.

Figure 5:
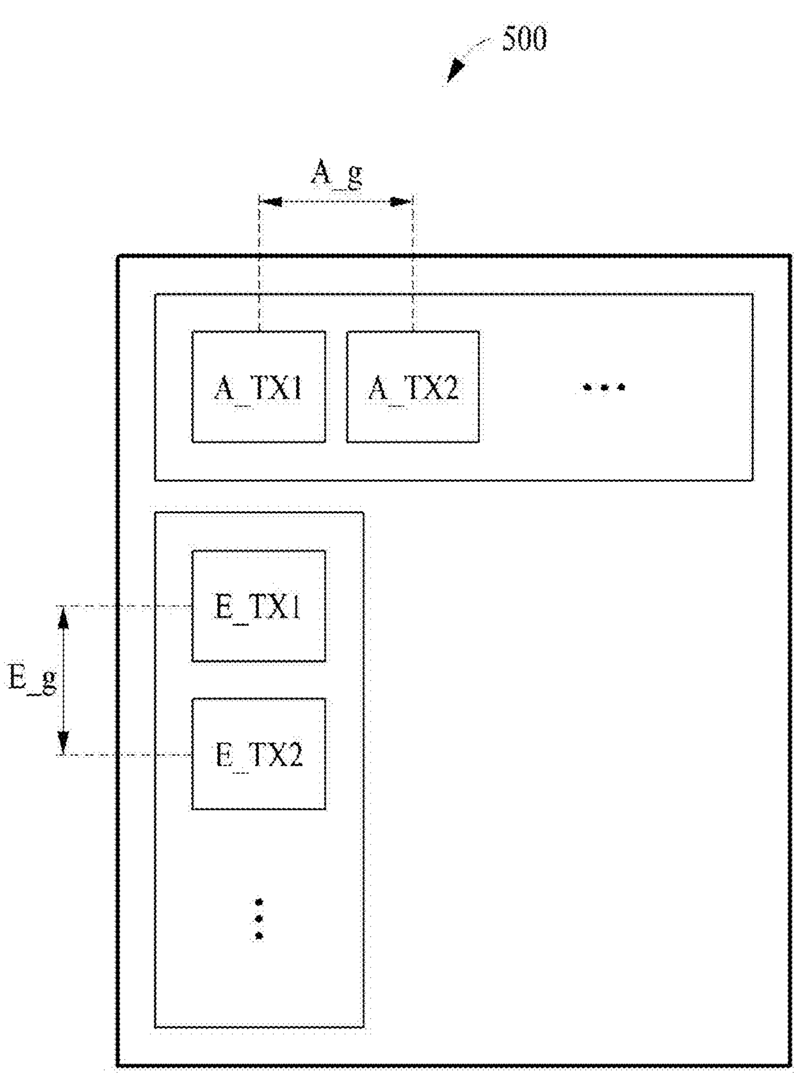
FIG. 5 illustrates an example of an arrangement of antenna elements in an array antenna, according to one embodiment.

FIG. 5 illustrates an example of an arrangement of antenna elements in an array antenna, according to one embodiment. As discussed below, the arrangement of the antenna elements may be arranged to provide an accurate elevation angle result while in other examples, the antenna elements in the antenna array may be arranged to provide an accurate azimuth angle. Doppler ambiguity may cause an aliasing effect. Similarly, an aliasing effect may occur based on an antenna element arrangement. The aliasing effect may cause DOA ambiguity and a grating lobe to occur.

Referring to FIG. 5, an array antenna 500 may include antenna elements A_TX1, A_TX2, E_TX1, and E_TX2. For example, the antenna elements A_TX1 and A_TX2 may be transmission antenna elements configured to measure an azimuth angle and the antenna elements E_TX1 and E_TX2 may be reception antenna elements configured to measure an elevation angle or an azimuth angle. Although not illustrated in FIG. 5, the array antenna 500 may further include additional antenna elements, such as reception antenna elements configured to measure an azimuth angle and reception antenna elements configured to measure an elevation angle.

The antenna elements A_TX1 and A_TX2 may be spaced apart from each other by an interval (or distance) A_g and the antenna elements E_TX1 and E_TX2 may be spaced apart from each other by an interval (or distance) E_g. In some examples, to achieve both the azimuth angle information and the elevation angle information, the distance at which one or more of the antenna elements A_TX1, A_TX2, E_TX1, and E_TX2 may be spaced at an uneven series of distances or in a non-uniform array pattern. In some examples, at least some of the intervals A_g and E_g may be wider than a half-wavelength of a carrier frequency for the radar system. For example, the array antenna 500 may be a non-uniform array that satisfies a predetermined operating condition to provide both azimuth angle and elevation angle capabilities. That is, some ADAS systems may be designed to measure both the elevation and azimuth angles. As a result of this desired operating condition for the ADAS, the antenna elements A_TX1 and A_TX2 may be a pair of neighboring antenna elements which are disposed closest to each other among antenna elements in an azimuth angle direction, and the antenna elements E_TX1 and E_TX2 may be a pair of neighboring antenna elements which are disposed closest to each other among antenna elements in an elevation angle direction. In this case, at least some of the intervals A_g and E_g may be wider than a half-wavelength of a carrier frequency, and due to such an arrangement of the array antenna 500, a grating lobe may occur by an aliasing effect on a DOA spectrum.

However, the azimuth angle measurement may require more information to assess the azimuth angle direction compared to the elevation angle direction and antenna elements may be more densely disposed in the azimuth angle direction. Accordingly, a distance between the antenna elements in the elevation angle direction may increase and a grating lobe may occur in a DOA spectrum in the elevation angle direction. The grating lobe may result in a reduction of the DOA estimation accuracy and may cause a severe error in a DOA estimation result of a target. For example, during AD, the grating lobe may cause the system to mistakenly determine that a traffic light is in front of the vehicle in the roadway, rather than in front of the vehicle but above the roadway, thereby causing the system to implement an emergency brake response.

Figure 6:
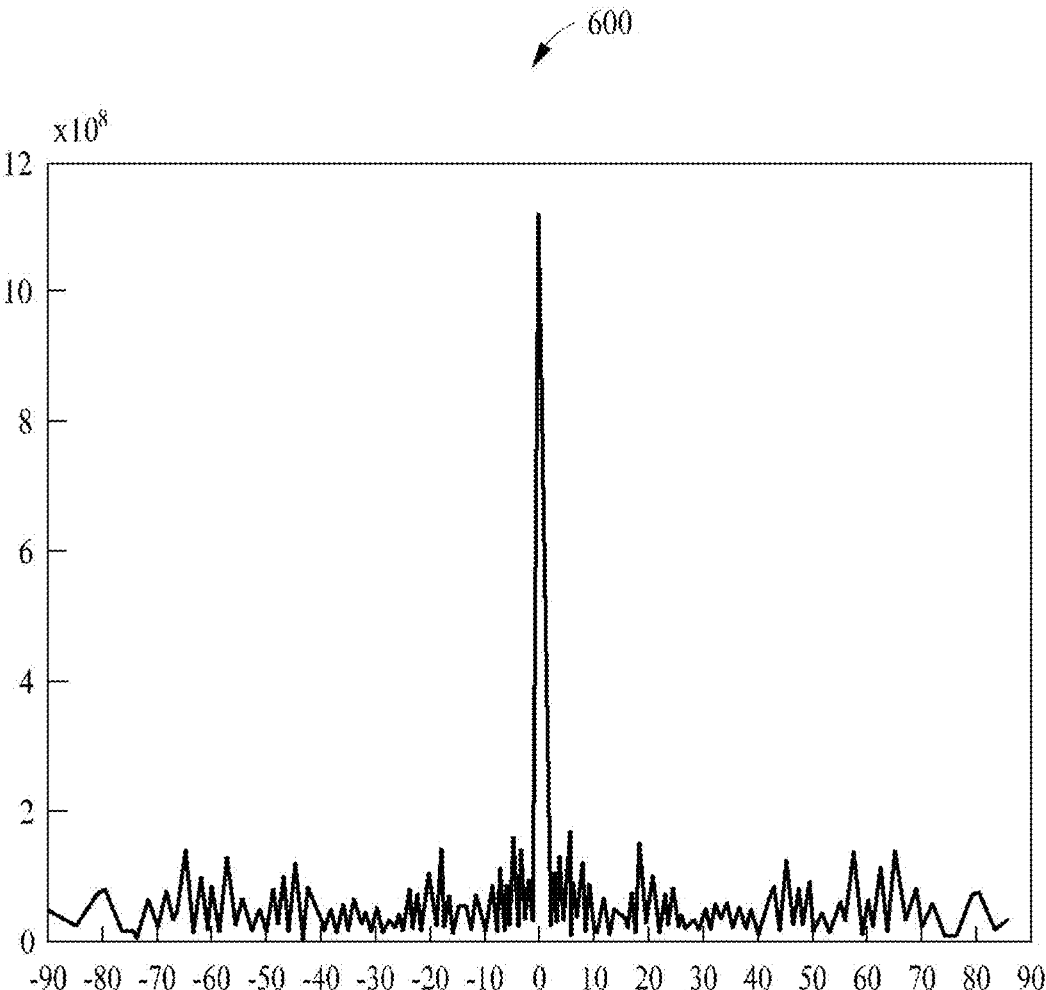
FIG. 6 illustrates an example of a direction of arrival (DOA) spectrum without a grating lobe.
Figure 7:
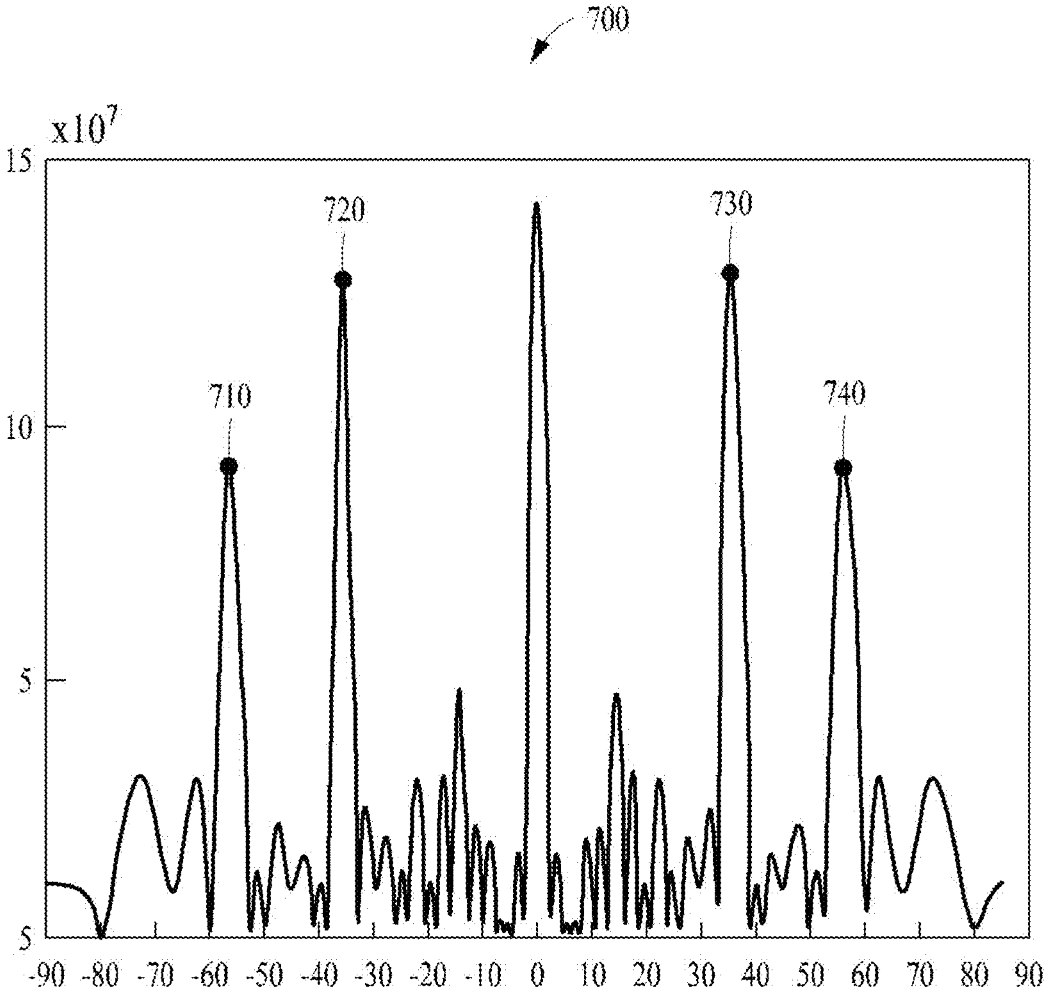
FIG. 7 illustrates an example of a DOA spectrum with a grating lobe.

FIG. 6 illustrates an example of a DOA spectrum without a grating lobe, and FIG. 7 illustrates an example of a DOA spectrum in which a grating lobe has occurred. For example, a DOA spectrum 600 of FIG. 6 may be derived from antenna signals measured by antenna elements in the azimuth angle direction, and a DOA spectrum 700 of FIG. 7 may be derived from antenna signals measured by antenna elements in the elevation angle direction. In this example, the antenna elements in the azimuth angle direction may be disposed in a narrower distance than a half-wavelength of a carrier frequency. The antenna elements in the elevation angle direction may include at least one pair of neighboring antenna elements which are disposed in a wider distance than a half-wavelength of a carrier frequency.

Figure 8:
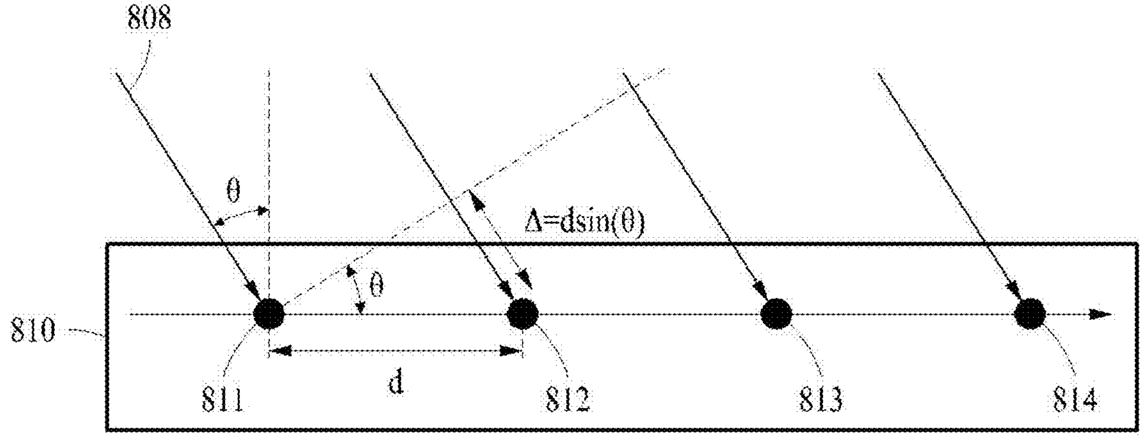
FIG. 8 illustrates an example of a reception antenna array of a radar sensor, according to one embodiment.

FIG. 8 illustrates an example of a reception antenna array of a radar sensor, according to one embodiment. Equation 5 shown below may be derived by analyzing the round-trip delay element of the beat frequency signal of Equation 1.

$$t_d = \frac{2R}{c} = \frac{2(R^0 + R^\theta)}{c} = \frac{2R^0 + d\sin\theta}{c} = t_{d,0} + t_{d,\theta} \quad \text{Equation 5}$$

In Equation 5, R may denote a range between an antenna element and a target, $R^0$ may denote a range between a radar sensor and the target, $R^\theta$ may denote a range difference based on a distance between antenna elements of the radar sensor, c may denote a velocity of light, and d may denote the distance between the antenna elements. According to Equation 5, a round-trip element may be decomposed into a range element $t_{d,\theta}$ and a DOA element $t_{d,\theta}$. Equation 1 may derive Equation 6 shown below, based on the range element $t_{d,\theta}$ and the DOA element $t_{d,\theta}$ of the round-trip element.

$$y(t) = \frac{\alpha}{2}\cos(\Phi_0 + \Phi_t(t_{d,0}) + \Phi_t(t_{d,\theta})) \quad \text{Equation 6}$$

$$\Phi_0 = -2\pi f_c t_{d,0} + \pi\frac{B}{T_c}t_{d,0}^2 - 2\pi f_c t_{d,\theta} + 2\pi\frac{B}{T_c}t_{d,0}t_{d,\theta} + \pi\frac{B}{T_c}t_{d,\theta}^2$$

$$\Phi_t(t_{d,0}) = -2\pi\frac{B}{T_c}t_{d,0}t$$

$$\Phi_t(t_{d,\theta}) = -2\pi\frac{B}{T_c}t_{d,0}t$$

A range to a target may be derived by detecting the $\Phi t(t_{d,0})$ element through a frequency analysis (for example, a Fourier transform) of a beat frequency signal for each antenna element. A DOA may be estimated by detecting a third term $2\pi f_{ctd,\theta}$ of the $\Phi_0$ element from a phase change between the antenna elements.

When the radar sensor includes a plurality of reception channels, phase information of radar data may represent a phase difference between a reference phase and a phase of a signal received through each reception channel. The reference phase may be a predetermined phase or may be set to a phase of one of the plurality of reception channels. For example, for a reception antenna element, a computing apparatus may set a phase of a reception antenna element adjacent to the reception antenna element to the reference phase.

In addition, the computing apparatus may generate, from the radar data, a radar vector of a dimension corresponding to the number of reception channels of the radar sensor. For example, in an example where the radar sensor includes four reception channels, the computing apparatus may generate a four-dimensional vector including a phase value corresponding to each reception channel. The phase value corresponding to each reception channel may be a numerical value representing the phase difference described above.

FIG. 8 illustrates an example that a reception antenna array 810 of a radar sensor includes a first reception antenna element 811, a second reception antenna element 812, a third reception antenna element 813, and a fourth reception antenna element 814. The radar signal radiated through any transmission antenna element may be reflected by a target, and then, may be received through the four reception antenna elements, that is, the first to fourth reception antenna elements 811 to 814. A phase of a signal received by the first reception antenna element 811 may be set to a reference phase. When a radar reflection signal 808 reflected by the same target is received by the reception antenna array 810, an additional distance Δ between the range from the target to the first reception antenna element 811 and the range from the target to the second reception antenna element 812 may be represented by Equation 7 shown below.

$$\Delta = d\cdot\sin(\theta) \quad \text{Equation 7:}$$

In Equation 7, θ may denote a DOA at which the radar reflection signal 808 is received from the target and d may denote a distance between the first to fourth reception antenna elements 811 to 814. In this example, a phase difference may be represented by Equation 8 shown below.

$$\Phi_{d,\theta}(n) = 2\pi f_c t_{d,\theta} = 2\pi\frac{n\cdot d\cdot f_c}{c}\sin\theta \quad \text{Equation 8}$$

In Equation 8, $\Phi_{d,\theta}(n)$ may denote a phase difference due to a DOA in an intermediate frequency of an n-th antenna element and c may denote the velocity of light. Equation 8 may apply to a uniform linear array. In case of a non-uniform linear array, the value of n may be adjusted based on a location of an antenna element. Equation 8 may be represented by Equation 9 shown below.

$$\Phi_{d,\theta}(n) = 2\pi\frac{n\cdot d}{\lambda}\sin\theta \quad \text{Equation 9}$$

In Equation 9, λ may denote a wavelength of a carrier frequency. A half-wavelength may be represented by 2/λ. According to Equation 9, when d>(2/λ), rather than a one-to-one relationship, a one-to-many relationship may be formed between $\Phi_{d,\theta}(n)$ representing a phase difference between antenna elements and θ representing a DOA and a grating lobe based on an aliasing effect may occur in a DOA spectrum.

Figure 9:
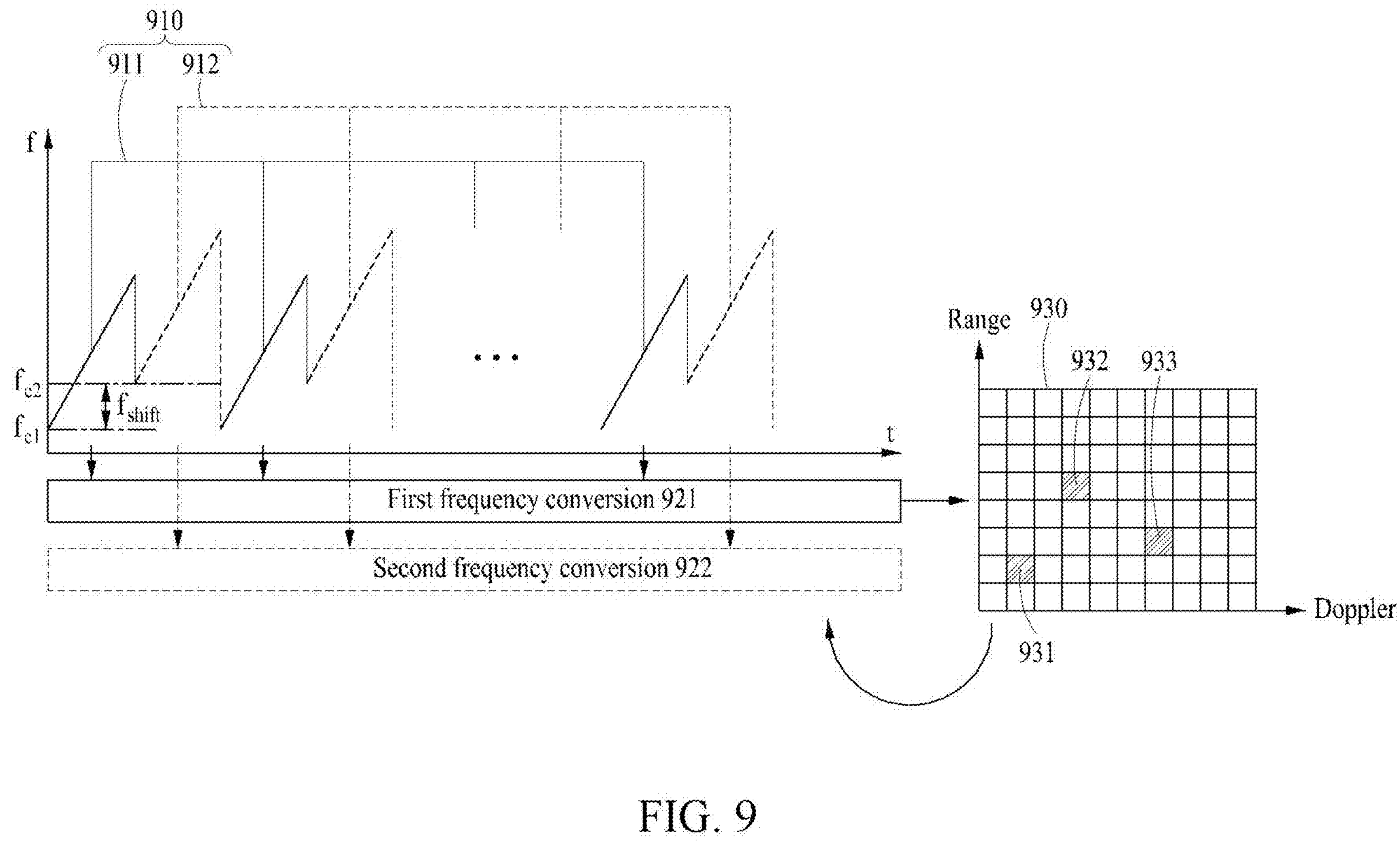
FIG. 9 illustrates an example of an operation of processing a radar signal using chirp sequences, according to one embodiment.

FIG. 9 illustrates an example of an operation of processing a radar signal using chirp sequences, according to one embodiment. A computing apparatus may avoid an aforementioned aliasing effect and grating lobe by using radar signals of various carrier frequencies.

Referring to FIG. 9, the radar signal may include a first chirp sequence signal of the first carrier frequency $f_{c1}$ and a second chirp sequence signal of the second carrier frequency $f_{c2}$. The radar signal may alternately include a first chirp element of the first carrier frequency $f_{c1}$ and a second chirp element of the second carrier frequency $f_{c2}$.

For example, a chirp sequence 910 may include a first sub chirp sequence 911 and a second sub chirp sequence 912. The first sub chirp sequence 911 may be based on the first carrier frequency $f_{c1}$, and the second sub chirp sequence 912 may be based on the second carrier frequency $f_{c2}$. The chirp sequence 910 may alternately include a first chirp element based on the first carrier frequency $f_{c1}$ and a second chirp element based on the second carrier frequency $f_{c2}$.

A radar signal may be received through an array antenna of a radar sensor and the radar signal may have a frequency characteristic based on the chirp sequence 910. For example, the radar signal based on the chirp sequence 910 may be a transmission signal that is transmitted through any one transmission antenna element in an array antenna, reflected by a target, and received through any one reception antenna element in the array antenna.

The computing apparatus may generate a first range-Doppler map 930 by performing a first frequency conversion 921 on the first chirp sequence signal. For example, the first frequency conversion 921 may be a two-dimensional (2D) Fourier transform including a first Fourier transform based on a range and a second Fourier transform based on a Doppler frequency. Here, the first Fourier transform may be a range-FFT, the second Fourier transform may be a Doppler FFT. The 2D Fourier transform may be a 2D FFT. The computing apparatus may perform the range-FFT based on the first chirp sequence signal and may perform the Doppler FFT based on a result of the range-FFT.

The computing apparatus may detect target cells 931 to 933 within cells that make up the first range-Doppler map 930. For example, the radar signal processing apparatus may detect the target cells 931 to 933 through CFAR on the first range-Doppler map 930. CFAR may be a thresholding-based detection method. Hereinafter, an operation of determining a Doppler velocity of a first target corresponding to the first target cell 931 of the target cells 931 to 933 is described. However, the operation may also apply to the additional targets of the other target cells 932 and 933.

The computing apparatus may perform a DOA estimation operation using radar data of a radar signal corresponding to the first target cell 931. The computing apparatus may estimate a first ambiguous DOA of a first target through the DOA estimation operation based on the first chirp sequence signal. For example, the DOA estimation operation may be performed by a known radar signal processing method. The first ambiguous DOA may have ambiguity based on an aliasing effect. The computing apparatus may determine a first phase difference of the first chirp sequence signal based on the distance between antenna elements of the array antenna and may determine a second phase difference of the second chirp sequence signal based on the distance between antenna elements of the array antenna. Each phase difference may be determined based on Equation 8 and/or Equation 9 where n, d, $f_c$, c, and λ may be known values and where the first ambiguous DOA may be used as θ. In this example, the distance between the antenna elements may be d or n*d.

The computing apparatus may determine a first DOA frequency based on the first carrier frequency $f_{c1}$ of the first chirp sequence signal by using the first phase difference and may determine a second DOA frequency based on the second carrier frequency $f_{c2}$ of the second chirp sequence signal by using the second phase difference. The computing apparatus may determine a frequency difference between the first DOA frequency and the second DOA frequency. The frequency difference may be determined by Equation 10 shown below.

$$\Delta f_\theta = f_{\theta 2,amb} - f_{\theta 1,amb} = \frac{d}{\lambda_2}\cdot\sin\theta - \frac{d}{\lambda_1}\cdot\sin\theta = \frac{d\cdot(f_2-f_1)}{c}\sin\theta = \frac{d\cdot f_{shift}}{c}\sin\theta \quad \text{Equation 10}$$

In Equation 10, $\Delta f_\Theta$ may denote a frequency difference, $f_{\Theta 1,amb}$ may denote the first DOA frequency, and $f_{\Theta 2,amb}$ may denote the second DOA frequency. The DOA frequency may be a value obtained by converting a DOA into a frequency. Equation 9 shown above may be expressed by Equation 11 shown below and the right side thereof may represent the DOA frequency. In Equations 10 and 11, θ may be assumed to be an actual DOA, in other words, $\theta_{GT}$. Hereinafter, "actual DOA" and "true DOA" may be used interchangeably. Due to this, $f_{\Theta 1,amb}$ and $f_{\Theta 2,amb}$ may have an ambiguity. In Equation $10_{\lambda 1}$ may represent a wavelength based on the first carrier frequency $f_{c1}$, and $\lambda_2$ may represent a wavelength based on the second carrier frequency $f_{c2}$.

$$\frac{\Phi_{d,\theta}(n)}{2\pi\cdot n} = \frac{d}{\lambda}\cdot\sin\theta \quad \text{Equation 11}$$

The first DOA frequency and the second DOA frequency may be derived by substituting the antenna element identifier n and the phase difference ($\Phi_{d,\Theta}$(n)) into the left side of Equation 11. Each DOA frequency may be dependent on the wavelength of each carrier frequency. A frequency difference $\Delta_{f\Theta}$ may be determined based on a characteristic of the wavelength that varies based on the carrier frequency, and a preliminary DOA may be estimated by using the frequency difference $\Delta_{f\Theta}$ as Equation 12 shown below.

$$\theta_{est} = \sin^{-1}\frac{\Delta f_\theta\cdot c}{d\cdot f_{shift}} \quad \text{Equation 12}$$

In Equation 12, $\theta_{est}$ may denote a preliminary DOA. The computing apparatus may estimate a preliminary DOA $\theta_{est}$ of a first target by using the frequency difference $\Delta_{f\Theta}$.

The computing apparatus may estimate the preliminary DOA $\theta_{est}$ based on a frequency difference $\Delta_{f\Theta}$ between the first DOA frequency and the second DOA frequency, the velocity of light c, the distance d between the antenna elements of the array antenna, and a frequency difference $f_{shift}$ between the first carrier frequency and the second carrier frequency. By using the frequency difference $\Delta_{f\Theta}$, a resolution to the problem of the ambiguity discussed above with respect to $f_{\Theta 1,amb}$ and $f_{\Theta 2,amb}$, may be obtained by resolving the aliasing effect.

Figure 10:
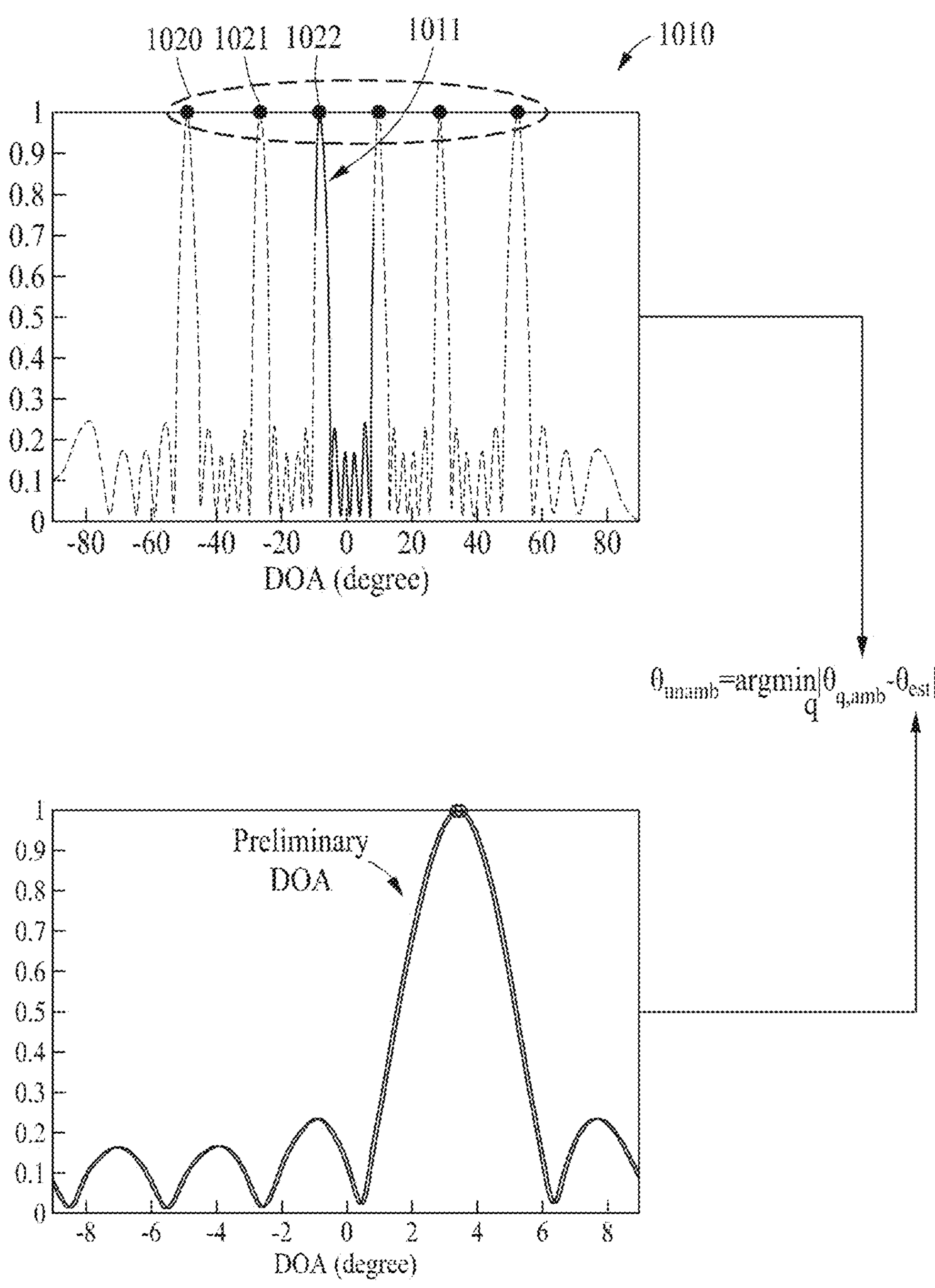
FIG. 10 illustrates an example of an operation of deriving a final DOA from ambiguous DOAs, according to one embodiment.

FIG. 10 illustrates an example of an operation of deriving a final DOA from ambiguous DOAs, according to one embodiment. A preliminary DOA may have a quantization error inversely proportional to the size of a dimension of a directional vector of a DOA algorithm. Such a quantization error may occur during an FFT operation for a frequency analysis and/or a matrix operation process when using the DOA algorithm for calculating a DOA from a radar signal. The computing apparatus may determine ambiguous DOA candidates where the candidates have an ambiguity but without having a quantization error, and the apparatus may select a final DOA from the ambiguous DOA candidates based on the preliminary DOA having an unambiguity.

The computing apparatus may determine the ambiguous DOA candidates having a predetermined time interval based on an ambiguity number from an ambiguous DOA of a target measured from the first chirp sequence signal. The periodic and/or ambiguous DOA candidates may be derived from a predetermined equation or a predetermined numerical table. The radar signal may include the first chirp sequence signal based on the first carrier frequency and the second chirp sequence signal based on the second carrier frequency. The computing apparatus may estimate a first ambiguous DOA of a first target through the DOA estimation operation based on the first chirp sequence signal. The second ambiguous DOA based on the second chirp sequence signal may be used instead of the first ambiguous DOA. The final DOA may be represented by Equation 13 shown below.

$$\theta_{unamb} = \underset{q}{\operatorname{argmin}} |\theta_{q,amb} - \theta_{est}| \qquad \text{Equation 13}$$

In Equation 13, $\theta_{unamb}$ may denote the final DOA, $\theta_{q,amb}$ may denote an ambiguous DOA candidate, $\theta_{est}$ may denote a preliminary DOA, and q may denote an ambiguity number. $\theta_{q,amb}$ may be repeated at a predetermined interval from the ambiguous DOA (e.g., the first ambiguous DOA or the second ambiguous DOA). For example, with reference to FIG. 10, a DOA spectrum 1010 may be derived by iterations of an original spectrum 1011. The iterations of the original spectrum 1011 are illustrated in FIG. 10 as dashed spectrums or spectrum portions. Peaks of the iterations are respectively illustrated in the alternatively dashed-line ellipse of FIG. 10, referred to as ambiguous DOA candidate values 1020. A peak of the original spectrum 1011 may correspond to an ambiguous DOA value 1022. An actual DOA may correspond to an ambiguous DOA candidate value 1021 among the ambiguous DOA candidate values 1020. Due to ambiguity of the ambiguous DOA value 1022, the ambiguous DOA value 1022 may not coincide with the actual DOA. Thus, in an example, the original spectrum 1011 in the DOA spectrum 1010 may represent a preliminary DOA.

Figure 11:
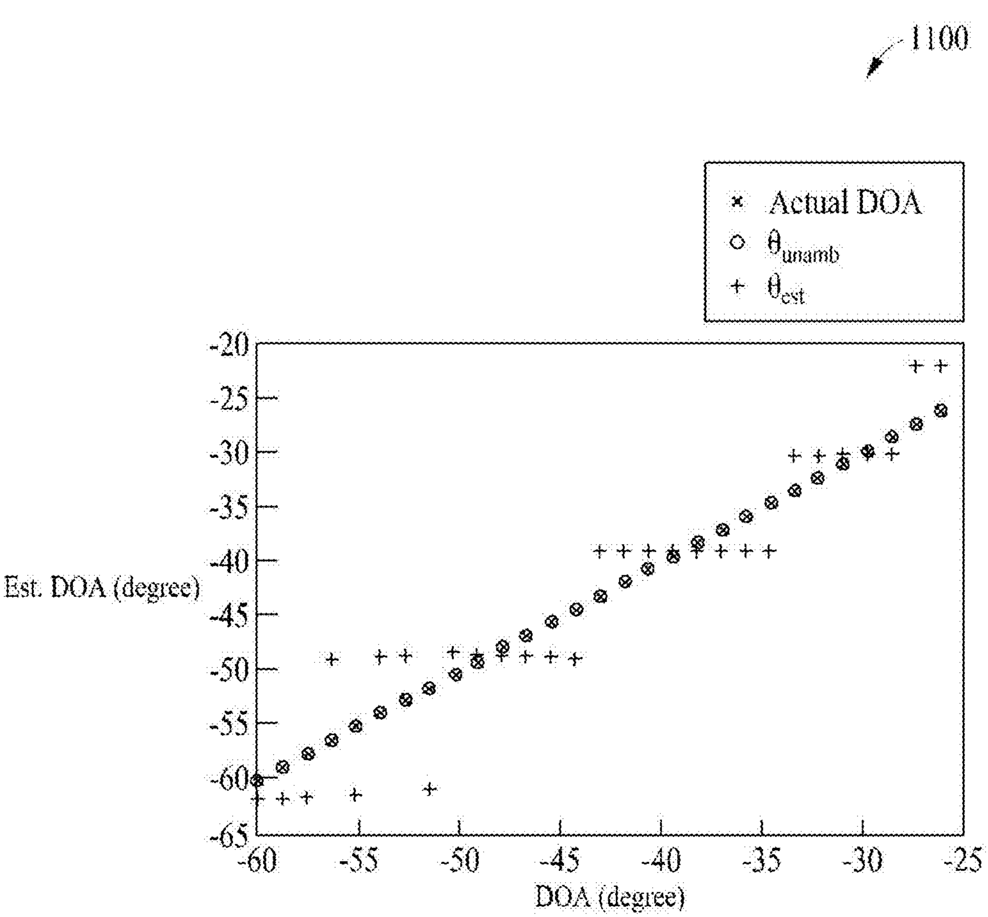
FIG. 11 illustrates an example of a distribution of an actual DOA, a final DOA, and a preliminary DOA, according to one embodiment.

The actual DOA may be found using the preliminary DOA. For example, according to Equation 13, the ambiguous DOA candidate that is closest to the preliminary DOA may be determined. In an example, the computing apparatus may select the final DOA to be the one iteration closest to the preliminary DOA, e.g., selected based on which of the ambiguous DOA candidate values 1020 is closest to the ambiguous DOA value 2022. In this example, of the ambiguous DOA candidate values 1020, the actual DOA having the smallest difference from the preliminary DOA may be selected to be the final DOA. The final DOA may have an unambiguous characteristic and may not include a quantization error. A difference corresponding to the quantization error may exist between the preliminary DOA and the final DOA. FIG. 11 illustrates an example of a distribution of an actual DOA, a final DOA, and a preliminary DOA, according to one embodiment. Referring to FIG. 11, in graph 1100, a preliminary DOA $\theta_{est}$ may include a quantization error, however a final DOA $\theta_{unamb}$ may not include a quantization error.

Figure 12:
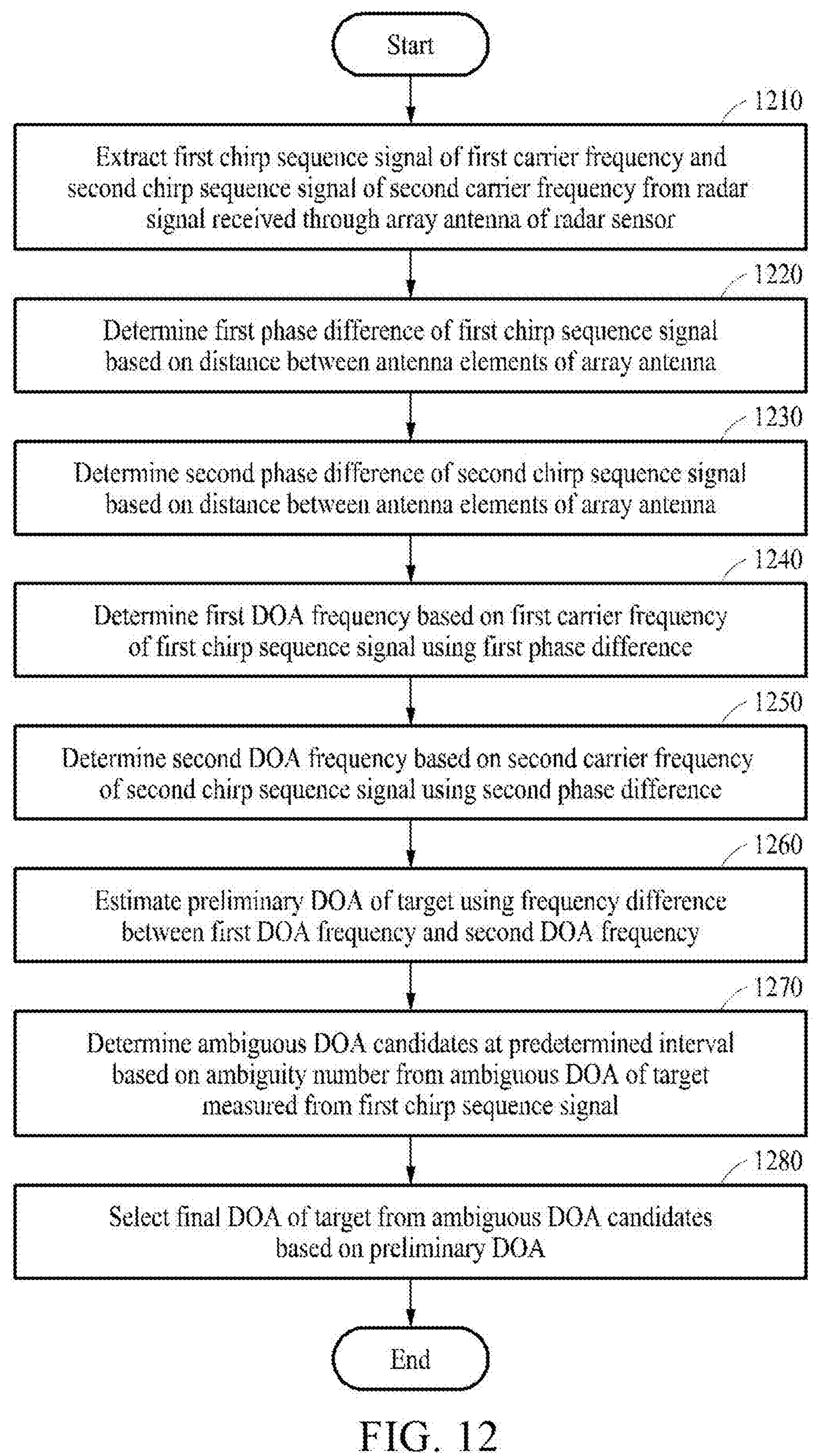
FIG. 12 illustrates an example of an operation of radar signal processing, according to one embodiment.

FIG. 12 illustrates an example of an operation of radar signal processing, according to one embodiment. Referring to FIG. 12, in operation 1210, a computing apparatus may extract a first chirp sequence signal of a first carrier frequency and a second chirp sequence signal of a second carrier frequency from a radar signal received through an array antenna in a radar sensor. In operation 1220, the computing apparatus may determine a first phase difference of the first chirp sequence signal based on a distance between antenna elements of the array antenna. In operation 1230, the computing apparatus may determine a second phase difference of the second chirp sequence signal based on the distance between the antenna elements of the array antenna.

In operation 1240, the computing apparatus may determine a first DOA frequency based on the first carrier frequency of the first chirp sequence signal by using the first phase difference. In operation 1250, the computing apparatus may determine a second DOA frequency based on the second carrier frequency of the second chirp sequence signal by using the second phase difference. In operation 1260, the computing apparatus may estimate a preliminary DOA of a target by using a frequency difference between the first DOA frequency and the second DOA frequency. In operation 1270, the computing apparatus may determine ambiguous DOA candidates at a predetermined time interval based on an ambiguity number from an ambiguous DOA of the target measured by the first chirp sequence signal. In operation 1280, the computing apparatus may select a final DOA of the target from the ambiguous DOA candidates based on the preliminary DOA.

In one example, operation 1280 may include an operation of selecting a closest one of the ambiguous DOA candidates to the preliminary DOA to be the final DOA of the target.

The array antenna may include a pair of neighboring antenna elements disposed at a wider distance than at least one of a first half-wavelength of the first chirp sequence signal and a second half-wavelength of the second chirp sequence signal, and a grating lobe may occur in at least a portion of a DOA spectrum of the first chirp sequence signal and the second chirp sequence signal due to the wider distance of the pair of neighboring antenna elements. The pair of neighboring antenna elements may include an arrangement to measure an elevation angle or an azimuth angle.

The preliminary DOA may include a quantization error based on at least a portion of a frequency analysis of the first chirp sequence signal and the second chirp sequence signal, and a difference corresponding to the quantization error may exist between the preliminary DOA and the final DOA.

The preliminary DOA may include unambiguity due to alleviation of an aliasing effect, and the ambiguous DOA candidates may include ambiguity due to the aliasing effect.

The first DOA frequency may be dependent on the first carrier frequency.

In an example, operation 1260 may include an operation of estimating the preliminary DOA based on the frequency difference between the first DOA frequency and the second DOA frequency, a velocity of light, the distance between the antenna elements of the array antenna, and the frequency difference between the first carrier frequency and the second carrier frequency.

The ambiguous DOA candidates may be derived from a predetermined equation or a predetermined numerical table by using the ambiguous DOA. The predetermined equations can include any one of equations 1-13, as discussed above.

The radar signal may alternately include a first chirp element of the first carrier frequency and a second chirp element of the second carrier frequency.

In addition, descriptions with reference to FIGS. 1 to 11 and FIG. 13 may be applicable to the radar signal processing method of FIG. 12.

Figure 13:
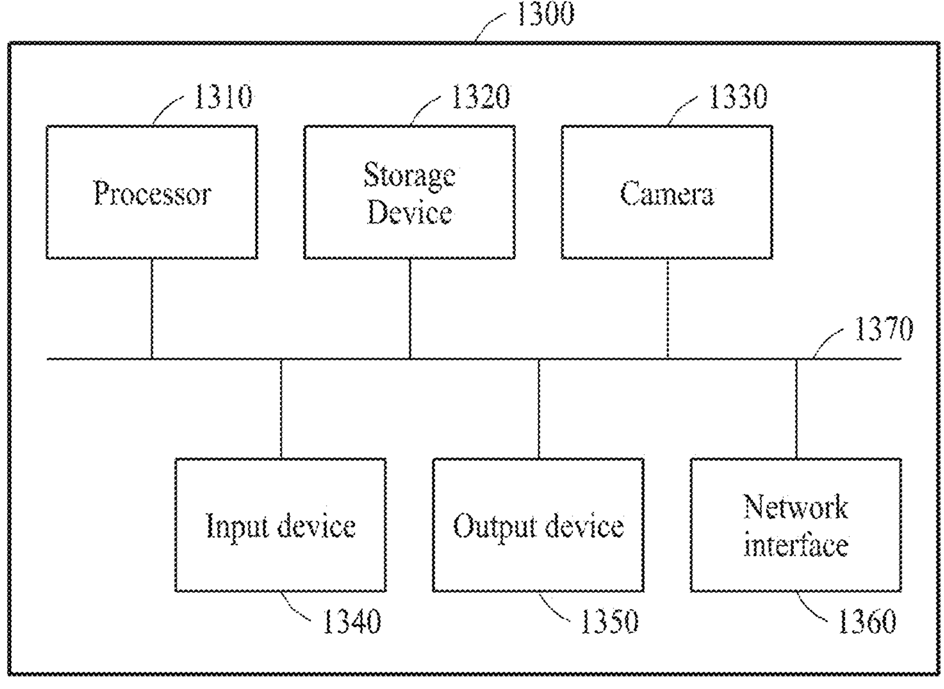
FIG. 13 illustrates an example of a configuration of an electronic device, according to one embodiment.

FIG. 13 illustrates an example of a configuration of an electronic device, according to one embodiment. Referring to FIG. 13, an electronic device 1300 may perform the radar signal processing method described above. For example, the electronic device 1300 may functionally and/or structurally include the computing apparatus 200 of FIG. 2, or any of the other above described computing apparatuses. The computing apparatus of FIG. 2, as well as the other above descried computing apparatuses are also representative of respective examples where the computing apparatuses are the electronic device 1300. The electronic device 1300 may be, for example, an image processing device, a smart phone, a wearable device, a tablet computer, a netbook, a laptop, a desktop, a personal digital assistant (PDA), a head-mounted display (HMD), a vehicle (for example, autonomous vehicle), or a driver-assistance device to be mounted on a vehicle. The electronic device 1300 is also representative of a vehicle.

Referring to FIG. 13, the electronic device 1300 may include a processor 1310, a storage device 1320, a camera 1330, an input device 1340, an output device 1350, and a network interface 1360. The processor 1310, the storage device 1320, the camera 1330, the input device 1340, the output device 1350, and the network interface 1360 may communicate with each other via a communication bus 1370.

The processor 1310 may execute instructions or functions to be executed in the electronic device 1300. For example, the processor 1310 may process the instructions stored in the storage device 1320. The processor 1310 may perform the operations described through FIGS. 1 to 12.

The storage device 1320 may store information or data necessary for the execution of the processor 1310. The storage device 1320 may include a computer-readable storage medium or a computer-readable storage device. The storage device 1320 may store instructions to be executed by the processor 1310 and may store related information while software and/or an application is executed by the electronic device 1300.

The camera 1330 may capture an image including a plurality of image frames. For example, the camera 1330 may generate a frame image.

The input device 1340 may receive an input from a user through a haptic, video, audio, touch input, as well as radar sensor 210 of computing apparatus 200 as illustrated, for example, in FIG. 2. That is, in some examples, the input device 1340 may include the antenna elements within the antenna array of radar sensor 200 where the antenna elements receive reflected radar signals. The input device 1340 may also include a keyboard, a mouse, a touch screen, a microphone, or any other device that detects the input from the user and transmits the detected input.

The output device 1350 may provide an output of the electronic device 1300 to the user through a visual, auditory, or haptic channel. The output device 1350 may include, for example, a display, a touch screen, a speaker, a vibration generator, or any other device that provides the output to the user. The network interface 1360 may communicate with an external device through a wired or wireless network. The output device 1350 may provide a result of processing radar data to the user using at least one of visual information, auditory information, and haptic information.

For example, when the electronic device 1300 is mounted on a vehicle, the electronic device 1300 may display a radar image map through a display. As another example, the electronic device 1300 may change any one or any combination of the velocity, the acceleration, and the steering of the vehicle equipped with the electronic device 1300 based on DOA information, range information, and/or the radar image map. However, examples are not limited thereto, and the electronic device 1300 may perform functions such as ACC, AEB, BSD, LCA, and ego-localization. The electronic device 1300 may structurally and/or functionally include a control system for such control of the vehicle.

The computing apparatus 200, radar sensors 210 and 310, processor 220, and electronic device 1300 described herein and disclosed herein described with respect to FIGS. 1-13 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method, the method comprising:

extracting a first chirp sequence signal of a first carrier frequency and a second chirp sequence signal of a second carrier frequency from a radar signal received through an array antenna in a radar sensor;

determining a first phase difference of the first chirp sequence signal based on a distance between antenna elements of the array antenna;

determining a second phase difference of the second chirp sequence signal based on the distance between the antenna elements of the array antenna;

determining a first direction of arrival (DOA) frequency based on the first carrier frequency of the first chirp sequence signal based on the first phase difference;

determining a second DOA frequency based on the second carrier frequency of the second chirp sequence signal based on the second phase difference;

estimating a reference DOA of a target based on a frequency difference between the first DOA frequency and the second DOA frequency;

determining ambiguous DOA candidates at a predetermined time interval based on an ambiguity number derived from an ambiguous DOA of the target measured by the first chirp sequence signal; and selecting a final DOA of the target from the ambiguous DOA candidates based on the reference DOA, wherein the ambiguous DOA candidates correspond to the determined first phase difference and the ambiguous DOA candidates have differences corresponding to the predetermined time interval.

2. The method of claim 1, wherein the selecting of the final DOA comprises selecting a DOA candidate closest one to the reference DOA from the ambiguous DOA candidates as the final DOA of the target.

3. The method of claim 1, wherein the array antenna comprises a pair of neighboring antenna elements disposed apart from each other at a distance that is larger than at least one of a first half-wavelength of the first chirp sequence signal and a second half-wavelength of the second chirp sequence signal.

4. The method of claim 3, wherein the pair of neighboring antenna elements comprises an antenna arrangement configured to measure one of an elevation angle or an azimuth angle.

5. The method of claim 3, wherein the selecting the final DOA accounts for a grating lobe occurring in at least a portion of a DOA spectrum due to the distance.

6. The method of claim 1, wherein the selecting of the final DOA accounts for a quantization error existing between the reference DOA and the final DOA.

7. The method of claim 1, wherein the first DOA frequency is dependent on the first carrier frequency.

8. The method of claim 1, wherein the estimating of the reference DOA comprises estimating the reference DOA based on the frequency difference between the first DOA frequency and the second DOA frequency, a velocity of light, the distance between the antenna elements of the array antenna, and the frequency difference between the first carrier frequency and the second carrier frequency.

9. The method of claim 1, wherein the ambiguous DOA candidates are derived from a predetermined equation or a predetermined numerical table based on the ambiguous DOA.

10. The method of claim 1, wherein the radar signal comprises:

a first chirp element of the first carrier frequency; and a second chirp element of the second carrier frequency, and wherein the first chirp element alternates with the second chirp element.

11. A non-transitory computer-readable storage medium storing instructions that, when executed by a processor, cause the processor to perform the method of claim 1.

12. An apparatus, the apparatus comprising:

a radar sensor configured to receive a radar signal through an array antenna; and a processor configured to:

extract a first chirp sequence signal of a first carrier frequency and a second chirp sequence signal of a second carrier frequency from the radar signal, determine a first phase difference of the first chirp sequence signal based on a distance between antenna elements of the array antenna, determine a second phase difference of the second chirp sequence signal based on the distance between the antenna elements of the array antenna, determine a first direction of arrival (DOA) frequency based on the first carrier frequency of the first chirp sequence signal based on the first phase difference, determine a second DOA frequency based on the second carrier frequency of the second chirp sequence signal based on the second phase difference, estimate a reference DOA of a target based on a frequency difference between the first DOA frequency and the second DOA frequency, determine ambiguous DOA candidates at a predetermined time interval based on an ambiguity number derived from an ambiguous DOA of the target measured by the first chirp sequence signal, and select a final DOA of the target from the ambiguous DOA candidates based on the reference DOA, wherein the ambiguous DOA candidates correspond to the determined first phase difference and the ambiguous DOA candidates have differences corresponding to the predetermined time interval.

13. The apparatus of claim 12, wherein the processor is configured to select a DOA candidate closest one to the reference DOA from the ambiguous DOA candidates as the final DOA of the target.

14. The apparatus of claim 12, wherein the array antenna comprises a pair of neighboring antenna elements disposed apart from each other at a distance that is larger than at least one of a first half-wavelength of the first chirp sequence signal and a second half-wavelength of the second chirp sequence signal.

15. The apparatus of claim 14, wherein the pair of neighboring antenna elements comprises an antenna arrangement configured to measure one of an elevation angle or an azimuth angle.

16. The apparatus of claim 12, wherein the selection of the final DOA accounts for a grating lobe occurring in at least a portion of a DOA spectrum due to the distance.

17. The apparatus of claim 12, wherein the selection of the final DOA accounts for a quantization error existing between the reference DOA and the final DOA.

18. The apparatus of claim 12, wherein the apparatus is a vehicle.

19. A vehicle, comprising:

a radar sensor configured to receive a radar signal through an array antenna;

a processor configured to execute instructions; and memory storing the instructions, which when executed by the processor configure the processor to:

extract a first chirp sequence signal of a first carrier frequency and a second chirp sequence signal of a second carrier frequency from the radar signal, determine a first phase difference of the first chirp sequence signal based on a distance between antenna elements of the array antenna, determine a second phase difference of the second chirp sequence signal based on the distance between the antenna elements of the array antenna, determine a first direction of arrival (DOA) frequency based on the first carrier frequency of the first chirp sequence signal based on the first phase difference, determine a second DOA frequency based on the second carrier frequency of the second chirp sequence signal based on the second phase difference, estimate a reference DOA of a target based on a frequency difference between the first DOA frequency and the second DOA frequency, determine ambiguous DOA candidates at a predetermined time interval based on an ambiguity number derived from an ambiguous DOA of the target measured by the first chirp sequence signal, and select a final DOA of the target from the ambiguous DOA candidates based on the reference DOA; and a control system configured to control a vehicle based on the final DOA, wherein the ambiguous DOA candidates correspond to the determined first phase difference and the ambiguous DOA candidates have differences corresponding to the predetermined time interval.

20. The vehicle of claim 19, wherein the selection of the final DOA accounts for a grating lobe occurring in at least a portion of a DOA spectrum due to the distance, and wherein the selection of the final DOA accounts for a quantization error existing between the reference DOA and the final DOA.

* * * * *